Oct. 16, 1956 A. G. WEIMERSHAUS 2,767,252

IMPULSE SENDER FOR TELEPHONE SYSTEMS WITH DIAL SERVICE

Filed Aug. 14, 1953 3 Sheets-Sheet 1

Oct. 16, 1956 A. G. WEIMERSHAUS 2,767,252

IMPULSE SENDER FOR TELEPHONE SYSTEMS WITH DIAL SERVICE

Filed Aug. 14, 1953 3 Sheets-Sheet 3

United States Patent Office 2,767,252

Patented Oct. 16, 1956

2,767,252

IMPULSE SENDER FOR TELEPHONE SYSTEMS WITH DIAL SERVICE

Alfred G. Weimershaus, Berlin-Steglitz, Germany, assignor to Deutsche Telephonwerke und Kabelindustrie Aktiengesellschaft, Berlin, Germany Application August 14, 1953, Serial No. 374,181

Claims priority, application Germany September 4, 1952

14 Claims. (Cl. 179—90)

This invention relates to an improved impulse sender for telephone systems having dial service. Generally in telephone systems with dial service, a subscriber or intermediary person desiring to establish a connection with another telephone station, the caller generally must make use of a dial switch or key sender. In order to do this several operations must be carried out, viz. the dial switch must be operated repeatedly or either several keys, and afterwards a special starter-key or a starter-lever must be manipulated. A certain period of time is required for dialing the subscriber's number in order to establish the connection.

To shorten this time, apparatus have been built with which only two operations are necessary for the dial process. These apparatus, with which a limited number of subscribers can be contacted, work primarily with a mechanical gear. Their operative characteristics are as follows: in a current-type box, placed next to and connected with the telephone station with dial switch, a cylinder is located which is driven by an electric motor or by a spring motor. This cylinder carries discs provided with interchangeable contact pins which embody the call-numbers of several subscribers. On the upper side of the box, on which the subscribers' names are indicated, a wiper shaft with an indicator can be shifted in a slot to select the subscriber being called. If after such an adjustment a special starter-lever is manipulated, the apparatus, by rotation of the cylinder, transmits a number of impulses to the public exchange that correspond to the dialed subscriber's number and thus establishes the connection to this subscriber. Adjusting of the wiper shaft, within a relatively narrow range, requires some attention to what is being done.

In addition, impulse senders which generally work by means of a mechanical drive, are also known. These senders require still less time when calling since they need only one operation to commence transmitting impulses. Generally these apparatus have a board on which pins are arranged in several rows. These pins can be employed in groups of different numbers corresponding to the number of impulses that are to be transmitted for each subscriber's number. Opposite to these rows a bar is mounted. The bar carries a slidable block provided with contact springs. If the bar and block are adjusted by simple shifting to one of the pin rows, and if the block is then released, it moves, by the action of a weight, over the row of pins and, thereby, sends impulses by means of its contact springs which feel the pins.

These impulse senders require considerable space, especially if they are constructed for establishing connections to a large number of subscribers. This increases the size of the board. These impulse senders are not suitable, apart from the disturbing pendulous weight, for use beside a telephone, for example, on a desk.

Finally, impulse senders are known which do not have the disadvantages of the foregoing apparatus consisting of an instrument which has two separate accessories. These impulse senders, which operate by electricity only, consist of a keyboard, which is placed next to the telephone, and of a relay box which can be mounted at some distance from the phone, for instance, in the same room on the wall or in a neighbouring room. The keys of the keyboard indicate the names of several subscribers. By pressing one of the keys, an electric stepping mechanims in the relay box is actuated. This mechanism feels the position of the pressed key and thereby transmits the number of impulses corresponding to the dialed subscriber and thus establishes the desired connection.

As these apparatus have to be connected not only to one but to two separate accessories, they have the disadvantage of having many lines. These lines or cords at the operator's position are quite annoying, the cables installed on the wall leading to the neighbouring room cause additional work in mounting.

My invention consists of an impulse sender which works principally by means of a mechanical drive and which, by a single manipulation, sends impulses required for establishing a connection to a desired subscriber out of a number of determinate subscribers without, however, having any of the above-mentioned defects of the known apparatus. One advantage is that for each subscriber there is a key which is arranged on the keyboard that is mounted on the housing of the sender. When depressed, this key selects the detents or adjusts the detent-piloting elements that correspond to the subscriber's call-number and starts a feeling mechanism which pilots the impulsing. The detents or detent-piloting elements are provided in a number corresponding to the cross-sum of the highest existing subscriber's number. The intervals between the series of impulses are determined by the configuration of a separate series of detents or detent-piloting elements. In the preferred type, the detents or detent-piloting elements are arranged next to another and the configuration, effective for the purpose, can be felt, as spacing, by an element that is moved step by step.

Two examples of the invention are represented in the drawing.

Figure 1:
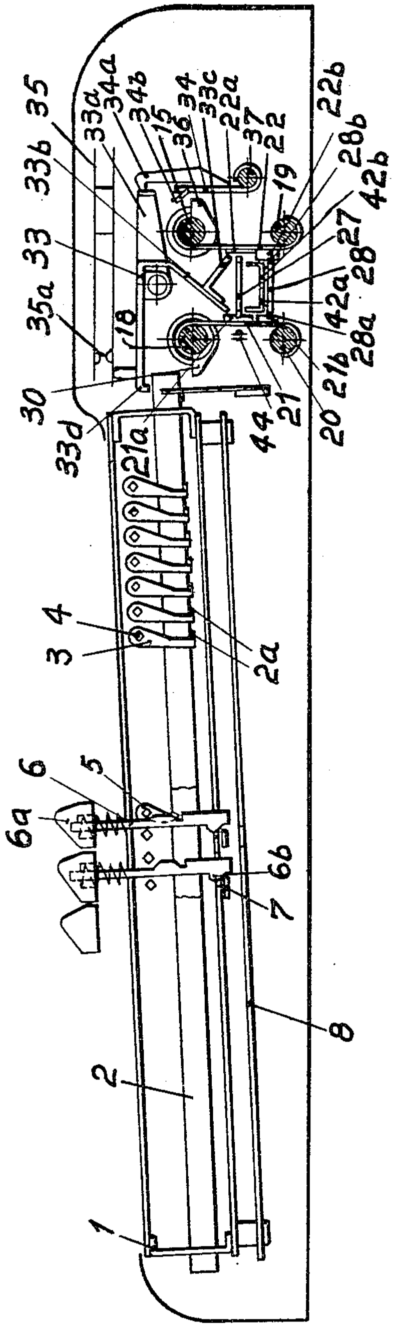
Figure 1 shows a side view in section in accordance with the invention.

In the figures, number 1 represents a frame in which 60 thin sheet-metal bars 2, shiftable lengthwise, are supported parallel to each other with small spacings. These bars 2 have angular lugs **2*a* behind which the small rocking levers 3 grip, by which the bars can be shifted in their longitudinal direction. The levers 3 are mounted on square shafts 4 which are supported in a plane at right angles to and above the bars 2. The number of these square shafts corresponds to the number of the subscribers to be selected with the appliance, i. e. thirty in the present example. Each shaft 4 carries as many levers 3 as the digits of the subscriber's numbers to be dialed. Each shaft 4 carries also a lever 5, having an angled lug which rests in such a position next to a key-shaft 6 that, on depressing the respective key, the corresponding shaft 4** is rotated counterclockwise to a small extent.

Figure 2:
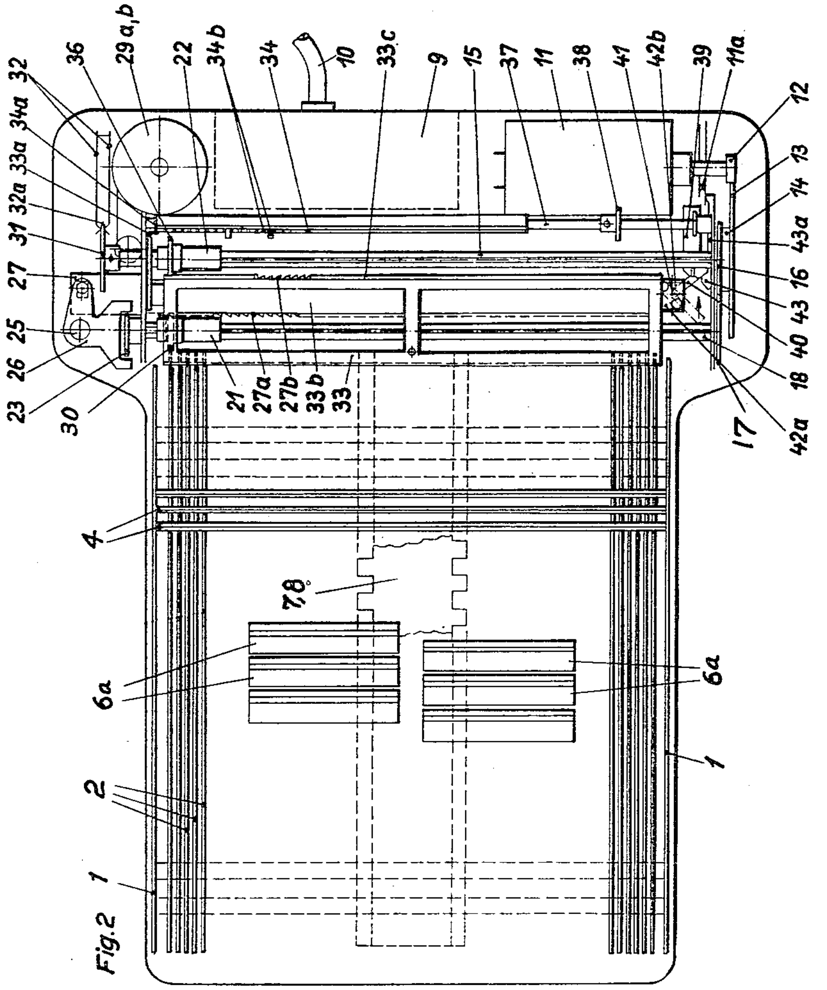
Figure 2 is a plan view of the apparatus.

To the six levers 3 that rest on the shaft 4 are allocated those bars 2 which, by pressing the key, correspond to the subscriber's number to be dialed. They are disposed in such a manner that the spacings of the bars 2, simultaneously advanced by the levers 3 as illustrated in Figure 2, are proportional to the individual digits of the subscriber's number in a direction beginning from the top and moving toward the bottom. If, for instance, the number 23 11 09 is to be dialed, the levers 3 are distributed on the corresponding shaft 4, in such a manner that viewed in a direction from the top toward the bottom on Figure 2, they are assigned to the 2nd, 5th, 6th, 7th and 26th bars. These bars are the bars that are shifted when manipulating the key.

The keys 6 are arranged in two rows of fifteen each, as can be seen in Figure 2. The key-heads 6*a* are bar-shaped in width. They are beveled toward the front and slightly inclined toward the rear so that the cross-section of the key row has the shape of saw teeth. This configuration allows easier depressing of the keys, since they lie in close proximity. The name of the subscriber can be fixed to the front inclined surface of the key-head. The key shafts have the projections 6*b* which, when pressing a key, shift a key-arresting bar 7 in the usual manner and consequently release a previously pressed key and hold in the depressed position the key that was last pressed due to the fact that the projection 6*b* lies under the corresponding lug of the bar 7. On depressing the key, the projection 6*b* strikes the lug of a second bar 8 arranged below the bar 7, and shifts the bar 7 to the left, as shown in Figure 1. This starts the impulsing which will be described later on.

Number 9 is a transformer, for example, a bell transformer which is connected to the mains supply 10. Number 11 is an electric motor which drives a shaft 15 via a pinion 12, a gear wheel 13 and a coupling device 14 and a shaft 18 via the gear wheels 16 and 17 of equal size. A rod 19 rests beneath the shaft 15 and a rod 20 rests beneath the shaft 18. The shaft 18 and the rod 20 are embraced by a metal bridge 21 which is slidable on 18 and 20 in longitudinal direction. The shaft 15 and the rod 19 carry a metal bridge 22 which can be shifted in the same manner.

One end of the shaft 18 supports an eccentric disc 23 held by the angular lever 26 that swivels on the axis 25. This eccentric disc imparts an oscillating motion to the lever 26 when the shaft 18 turns. A pin of the lever 26 rides in the slot of a lengthwise slidable bar 27 and causes this bar to oscillate when rocking the lever 26. On one side, the bar 27 has serrations 27*a*, the spacing of which corresponds to the separation of the bars 2. A bar 28 is permanently attached underneath the bar 27; the bar 28 is provided with the same serrations as the bar 27. The bridge 21 carries two flat springs 21*a* and 21*b* which become effective as pawls and of which first catches the toothing 27*a* of the bar 27 and the second one engages in the toothing 28*a* of the bar 28. A band is attached to the bridge 21. As illustrated in Figure 2, a spring box 29*a* attempts to pull the bridge upwards by means of this band. It is evident that the oscillating bar 27, contrary to the spring pull, shifts the bridge downward step by step so long as the spring 21*a* is engaged in the serrations 27*a* and the spring 21*b* is also caught by the serrations 28*a* of the bar 28. At each step of the bridge 21, same is transported by the bar 2 up to the adjacent bar 2. During its stepping movement the bridge 21 feels the spacing of the shifted bars 2 and thereby the individual digits of the subscriber's number.

The second bridge 22 serves the purpose of determining the intervals between the series of impulses. It works in a manner analogous to bridge 21. The bars 27 and 28, however, have still a second serration 27*b* or 28*b*. The bridge 22 carries two flat springs 22*a* and 22*b* which are effefctive as pawls and which work together with the said serrations in such a manner that the oscillating bar 27 can also transport downward step by step the bridge 22 contrary to the pull of the spring box 29*b*, as shown in Figure 2.

As mentioned, the bridge 21 is to feel the shifted bars 2 and to send impulses according to their separations or spacing. Due to the small and thus convenient size of the apparatus the lateral spacing of the bars 2 and also the stepping ofthe bridge 21 is in small increments. Since the increments are small the actuating members must be precise in controlling the movement and any reaction to this movement must be undertaken by sensitive means accordingly a shaft 18 is provided with a longitudinal slot. This slot engages a projection of a cam 30 which rests on a bushing that is slidable lengthwise on the shaft 18. The bridge 21 catches this bushing by the cutout provided for this purpose in such a manner that in its step-by-step movement the bridge 21 carries the bushing along. For each rotation of the shaft 18, the cam carries out an identical rotation and, at each half rotation of the shaft 18, a lateral shifting simultaneously. The result is a kind of spiral movement. During each half rotation, which the cam 30 is not shifted, the cam rests in the plane of a bar 2. The cam 30 passes in front of the bars 2 that have not been shifted without being arrested. If, however, a bar is shifted, then this bar lies in the path of the cam in such a manner that the cam strikes the bar and pivots it upwards. In the present example, the set-up has been so arranged, for reasons of simplicity, in such a manner that the right end of the bar itself is struck upwards. In order to save material and reduce the noise level, it may also be practicable to construct the end of the bar as a pivoted arm which is pressed upwards by the cam 30 on advancing the bar, while the bar itself only carries out the adjusting longitudinal movement.

The shafts 15 and 18, for instance, carry out one rotation in 1/10 second. As illustrated in Figure 2, the shaft 15 bears on its upper end a sector of insulating material which, during each rotation of the shaft, opens the springs 32 and consequently the impulse contact 32*a* for a period of thirty-six m. seconds. For each rotation of the shafts 15 and 18 an impulse is sent. During the passage of the sector 31 through the springs 32 a shifting step of the bridge 21 takes place simultaneously. If while rotating the cam 30 reaches the plane of an advanced bar, it strikes the bar and moves it upwards thereby pivoting a multiarm shifter 33 clockwise as well as its arm 33*d* which has a resilient rest on all the bars 2. A hook 34*a* drops over the end of the arm 33*a* of the shifter and arrests the latter in the pivoted position. In this position the shifter, by means of a nipple stud provided at the end of its arm 33*d*, actuates a contact 35*a* and, thereby, short-circuits the impulse contact 32*a*.

The duration of this short-circuit is determined by the second bridge 22. The shifter 33 has an additional arm 33*b*, the lower edge of which extends over the entire length of the serrations 27*a* and another arm 33*c*, the edge of which extends over the length of the serrations 27*b*. In the position of the shifter 33 as drawn in Figure 1, the arm 33*c* presses the flat spring 22*a* out of engagement with the serrations 27*b* so that the bridge 22 is not shifted by the oscillating bar 27. On the other hand, the flat spring 21*a* is engaged in the serrations 27*a*, whereby the bridge 21 is moved step by step. In the forementioned clockwise pivoting of the shifter 33 caused by the cam 30, the spring 21*a* is pressed aside so that there is no further shifting of the bridge 21, hence the flat spring 22*a* can enter into the serrations 27*b* of the oscillating bar 27 and the bridge 22 starts to move downwards step by step. The bridge 22 also carries with it a rotating cam 36 the same as bridge 21 does.

A bar 34 with the hook 34*a* is attached on a shaft 37 parallel to the path of the bridge 22. It pivots loosely around this shaft. The bar 34 has several prongs on its upper edge in the spacing of the bars 2. As shown in Figure 1, certain of these prongs can be set by pliers, etc. The separation of the set prongs from each other determines the duration of the intervals between the series of impulses.

If the contact 35*a* is closed, at each rotation of the shaft 15, the bridge 22 is shifted by one step. As soon as the cam 36 arrives in the plane of a prong 34*b*, the former strikes this prong and thereby pivots the bar 34 against the urging of a spring. The hook 34*a* releases the arm 33a and the shifter 33 drops back into the position as indicated in the drawing. This again arrests the further transport of the bridge 22 while the bridge 21 renews its step-by-step displacement. Since the contact 35a was opened on the return of the shifter 33 to the position shown in the drawing, the impulse contact 32a again becomes effective for a given number of rotations of the shaft 18 and shiftings of the bridge 21 until the cam 30 arrives underneath the next advanced bar 2. The alternating cycle between the impulse-counting bridge 21 and the interval-counting bridge 22 is repeated.

If, after the last series of impulses, the shifter 33 is again pivoted to the indicated position, the bridge 22 continues to shift until the cam 36 strikes against a stop 38 which is fixed to the shaft 37 and thereby pivots clockwise the said shaft. By this a slide 39 is shifted towards the left; this slide pivots a three-arm lever 4 clockwise around the center of rotation 41. Two bars 42a and 42b are hinged on the two short arms of the three-arm lever 40 in such a manner that, with a respective lever hinged on the other end of the bars, they form a lever-parallelogram. The parallelogram is moved by pivoting the lever 40 so that the bars 42a and 42b are separated parallel to each other. Their high-angled edges, which extend over the entire length of the serrations 27a and 27b, press all four flat springs 21a, 21b, 22a and 22b out of the serrations of the bars 27 and 28, whereby the two bridges, under the action of the spring box 29a and 29b slide back into their starting position.

By depressing the respective key, the impulsing is started in the following manner: the starter-bar 8, by intermediary means (not shown in the drawing) moves in a direction towards the right, and acts on the three-arm lever 40 which stands in the original position on the dotted line and pivots the lever to the position represented by the solid lines. This lever is thereby pivoted around its axis 43a over a facet of the lever 43. In this movement the elver 43 engages the coupling 14 and, by means of the contact 11a, closes the exciting circuit of the motor 11. After this, the above-described alternating cycle between the two bridges 21 and 22 commences.

Should a repetition of this impulsing be desired as, for instance when the called subscriber is engaged, it is only necessary to once again depress firmly the respective key that was formerly depressed. The projection 6b which rests behind the lug of the bar 7 again actuates the starter-bar 8.

In the above-described shifting of the slide 39 towards the left at the end of the impulsing and of the clockwise pivoting of the three-arm lever 40, this lever is simultaneously removed from the projection of the lever 43 whereby the latter drops back to its position, as indicated in the drawing and, by the action of a spring, releases the coupling 14 and opens the contact 11a.

Provision is made so that the bridge 21, at the beginning of its movement performs a certain preliminary movement by carrying out several idle steps before reaching the first shifted rod 2. During these steps a contact 44 is closed, by which the impulse contact 32a is short-circuited, so that there is no impulsing during the preliminary movement. The preliminary movement serves the purpose of allowing the motor 11 to run up to the norminal number of revolutions in order to thereafter start the impulsing.

As is evident from the foregoing description, the entire path of displacement of the bridge 21 is proportional to the cross sum of the subscriber's number. With the arrangement of sixty bars 2, corresponding to a number 00 00 00, in an appliance of the indicated capacity subscriber's numbers with more than six digits can be incorporated as long as their cross sum is not larger than sixty, which is seldom the case.

As already mentioned, the duration of the impulse intervals between the separate series of impulse is determined by the spacings of the angled prongs 34b of the bar 34. By providing corresponding angles it is also possible to obtain impulse intervals of optional duration in case of the occurrence of subscriber's numbers which require intervals of different duration between their digits. An interval of some duration then occurs also with such digits that do not actually require it. However this interval is unimportant as it lasts only one-tenth second. The apparatus can also be so that it incorporates double the number of subscribers, i. e. in the present instance, for sixty subscribers. In this case, provision is made for two additional rows of keys made together with a further row of an additional thirty square shafts 4 whereby these shafts rest below the bars 2 in a mirror-picture position to the upper shafts 4; and the corresponding levers 3, which grip the same lugs 2a, protrude towards the top.

It is evident from the above discussion that in the embodiment of the invention shown in Figures 1 and 2, a key is assigned to each of the subscribers on the keyboard mounted on the housing of the sender. By manipulating this key the detents corresponding to the call-number of the subscriber are selected and adjusted mechanically. The running of a feeler-mechanism, which pilots the impulsing, is carried out up to a definite detent. After terminating the impulsing, the last-acting of two slides of the feeler-mechanism, which is still in an idle state, is stepped up to the indicated stop and only after this slide has reached the stop is the return of the mechanism to its initial position initiated by spring tension, whereafter the impulse sender s ready for renewed impulsing.

Figure 3:
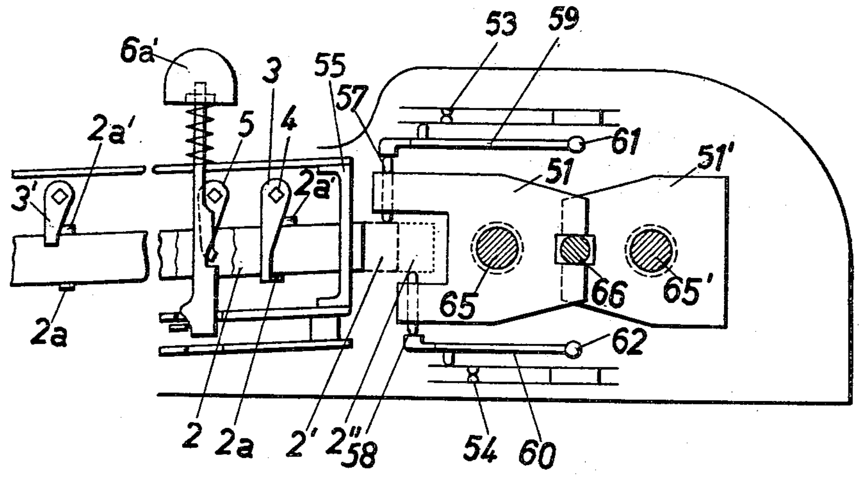
Figure 3 shows only those structural parts, of a second embodiment of the invention, which are different from the embodiments in Figures 1 and 2.

The embodiment of the invention shown in Figure 3, represents a further development of the impulse sender shown in the Figures 1 and 2. Insofar as the type, shown in Figure 3, also works independent of the respective number of digits of the corresponding call-numbers. In other words—to this embodiment, can be connected subscribers with a call-number of 3 digits as well as subscribers with a 4-digit and also a 5-digit call-number, etc. In addition, their readiness for use is reestablished with greater rapidity than is possible with the construction described in the Figures 1 and 2.

These advantages are attained in that the return to the original position of the slides, that pilot the impulsing, is carried out by one of these slides immediately after it strikes the stop corresponding to the last used call-number digit.

In Figure 3, 51 and 51′ represent the slides which, as the bridges 21 and 22 in the set-up according to Figures 1 and 2, pilot the impulsing or the intervals between the separate series of impulses. These slides have the shape of nuts which, by rotation of the spindles 65 and 65′, can be shifted on the latter. The rod 66 serves as a guide for both nuts or slides. Pins 57 and 58 are arranged in slide 51 so that they can be shifted and act as feeler-pins which act on the flaps 59 or 60 that rotate around the axis 61 or 62 and which on their part actuate the contacts 53 or 54. Number 2 indicates bars that serve as stops and that are supported in a frame 55. These bars have a number of levers 3′ that is equal to the number of digits of the call-number to be selected. In addition, a lever 5 rests on each shaft 4. The angled lug of this lever rests behind the facet of the shaft of the key 6a′ in such a manner that, by depressing the respective key, the corresponding shaft 4 is pivoted counter-clockwise to a small extent and thereby the bar 2, the lug 2a′ which is engaged by the lever 3′, is shifted toward the right. Two kinds of the levers 3 and the lugs 2a are provided. The levers 3′ corresponding up to the last call-number digits have a short length and act on the lugs 2a′ that are arranged on the upper edge of the bars 2. On the other hand, the lever, designated as 3 and which corresponds to the respective last call-number digit, is longer and acts on a lug 2a′ that is provided at the lower edge of the bar. In this manner, this lever shifts the corresponding bars to a greater extent.

The method of operation of the apparatus shown in Figure 3, is as follows:

If a certain key 6a' is depressed for calling a subscriber, one of the bars 2 corresponding to the group of the subscriber's call-number is thereby displaced. If, for instance, a 6-digit call-number is used, the bars corresponding to the first five digits of this number are shifted to such an extent that they reach the position 2' indicated by the broken lines. The bar corresponding to the sixth digit, however, is shifted to a greater extent than the aforementioned five bars, namely up to the position 2'' indicated by the dotted lines. In the intervening time, as described in the explanations of Figures 1 and 2, the remaining structural components of the apparatus are now in action, i. e. the slide 51 has started to actuate and has initiated the transmission of the series of impulses corresponding to the first call-number digit. If slide 51 now strikes with its feeler 57 the first of the shifted bars 2', then the feeler 57 is lifted, whereby the flap 59 is pivoted around the axis 61 and the latter closes the contact 53. This interrupts the movement of the slide 51, and ends the transmission of the first series of impulses and sets slide 51' in motion, which now determines the interval between the first and second series of impulses. Further impulsing continues, as described above, by the alternate stepping movement of the slides 51 and 51' until the slide 51 with its feeler 58 strikes the bar 2'' which corresponds to the last call-number digit. At this moment the feeler 58 is pressed downward and pivots the flap 60 counter-clockwise around the axis 62, thereby actuating the contact 54 and, in variation to the construction described in Figures 1 and 2, then releases the immediate return of the two slides 51 and 51' to their original position by the reversal of direction by the motor rotating the spindles 65 and 65'.

What is claimed is:

1. An automatic impulse transmitter for telephone dialing comprising a keyboard having a plurality of keys each allocated to a different subscriber, a plurality of detent elements arranged in a row and representative of numbers to be dialed, said detent elements having relative spacings corresponding to their respective numbers, the total number of said detent elements being equal to the highest cross-sum that a subscriber's number can have, selecting means connected to each subscriber's key and responsive to the movement thereof to select and operate a configuration of said detent elements corresponding to the call number of the subscriber whose key has been moved, impulsing means responsive to the detent elements for producing series of impulses corresponding to the digits of said call number, said impulsing means including a feeler mechanism for sensing the detent elements and means response to the selected detent elements for producing predetermined intervals between said series of impulses, said feeler mechanism including a feeler element and means for moving the feeler element step-by-step from one detent to the next and means for operating the impulsing means in response to the movement of a key.

2. An automatic impulse transmitter for telephone dialing comprising a keyboard having a plurality of keys each allocated to a different subscriber, a plurality of detent elements having a lateral and longitudinal dimension and being arranged in a row and representative of numbers to be dialed, said detent elements having relative spacings corresponding to their respective numbers the total number of said detent elements being equal to the highest cross-sum that a subscriber's number can have, selecting means connected to each subscriber's key and responsive to the movement thereof to select and operate a configuration of said detent elements corresponding to the call number of the subscriber whose key has been moved, said selecting means comprising a pivotally mounted bar being disposed normal to said detent elements and carrying a plurality of lever arms, at least one of said lever arms being engaged and moved by said subscriber's key so that selected detent elements are engaged by said lever arms and are displaced in the direction of their longitudinal dimension when said respective subscriber's key is actuated, and impulsing means responsive to the detent elements for producing series of impulses corresponding to the digits of said call number and means for operating the impulsing means in response to the movement of a key.

3. An automatic impulse transmitter for telephone dialing comprising a keyboard having a plurality of keys each allocated to a different subscriber, a plurality of detent elements arranged in a row and representative of numbers to be dialed, said detent elements having relative spacings corresponding to their respective numbers, the total number of said detent elements equal to the highest cross-sum that a subscriber's number can have, selecting means connected to each subscriber's key and responsive to the movement thereof to select and operate a configuration of said detent elements corresponding to the call number of the subscriber whose key has been moved, impulsing means responsive to the detent elements for producing series of impulses corresponding to the digits of said call number, said impulsing means including a feeler mechanism for sensing the detent elements, said feeler mechanism having two electrically driven stepping means, one stepping means controlling the duration of the individual series of impulses and the second stepping means controlling the duration of the intervals between the series of impulses in accordance with the positions of the detent elements, and means for operating the impulsing means in response to the movement of a key.

4. An impulse transmitter according to claim 2, wherein each stepping means includes a cam, a shifting means positioned to be engaged and operated by the cam of the first stepping means to arrest the movement of the first stepping means and interrupt the transmission of impulses and start the second stepping means, and means responsive to the arrival of the second stepping means at a predetermined position for causing its cam to release the shifting means and thereby stop the second stepping means, start the first stepping means and cause the resumption of transmission of impulses.

5. An impulse transmitter according to claim 4, wherein the stepping means includes a motor, two toothed racks, a shaft parallel to said racks, means connecting the shaft and a first of said racks to the motor to rotate the shaft and oscillate said first rack in its longitudinal direction, the second rack being fixed, and a bridge having spring detents positioned to engage said racks, whereby the first rack steps the bridge along and the second rack serves to latch the bridge against backward movement.

6. An impulse transmitter according to claim 5, including a second shaft connected to the motor, each cam including a bushing mounted on said shaft so as to slide therealong and rotate therewith, a second bridge connected to the second stepping means for movement along said second shaft, each bridge being positioned to engage one of said cams and its bushing and slide it along its respective shaft.

7. An impulse transmitter according to claim 6, wherein the first and second racks are toothed along two longitudinal edges, the second bridge having spring detents for engaging the teeth along one edge of each rack.

8. An impulse transmitter according to claim7, wherein the shifting means causes the spring detents of the two bridges to engage and disengage the rack alternately, second shifting means actuated by the cam of the second stepping means for engaging and disengaging all spring detents from the rack simultaneously, and means for returning the bridges to their starting positions when all spring detents are disengaged and for stopping the motor.

9. An impulse transmitter according to claim 8, including means for actuating the second shifting means in response to movement of a subscriber's key so that the second shifting means causes the motor to be energized and coupled to the shafts.

10 An impulse mechanism according to claim 9, wherein the means for actuating the second shifting means is constructed so as to actuate the second shifting means again in response to a further movement of an already operated key.

11. An automatic impulse transmitter for telephone dialing comprising a keyboard having a plurality of keys each allocated to a different subscriber, a plurality of detent elements arranged in a row and representative of numbers to be dialed, said detent elements having relative spacings corresponding to their respective numbers, the total number of said detent elements being equal to the highest cross-sum that a subscriber's number can have, selecting means connected to each subscriber's key and responsive to the movement thereof to select and operate a configuration of said detent elements corresponding to the call number of the subscriber whose key has been moved, impulsing means responsive to the detent elements for producing series of impulses corresponding to the digits of said call number, said impulsing means including a feeler mechanism for sensing the detent elements and including a pair of slides and means for returning the slides to their starting positions in response to an engagement of a first of said slides with the detent element corresponding to the last digit of a selected call number, and means for operating the impulsing means in response to the movement of a key.

12. An impulsing transmitter according to claim 11, wherein the selecting means shifts the selected detent elements but shifts the detent element corresponding to the last digit by a different amount from that of the other detent elements.

13. An impulse transmitter according to claim 12, including a pair of rotatable threaded spindles, each slide comprising a nut on one of the spindles, a pair of feelers on one of said nuts positioned to contact the shifted detent elements, means for stopping and restarting the movement of the slides in response to a contact of one of said feelers with a detent element, the second feeler being positioned to contact the detent element corresponding to the last digit of a call number to cause the slide returning means to return the slides to their starting positions.

14. An impulse transmitter according to claim 12, including means controlled by the first slider for determining the duration of the individual series of impulses and means controlled by the second slider for determing the duration of the interruptions between the series of impulses.

References Cited in the file of this patent

UNITED STATES PATENTS

| | | |
|---|---|---|
| 2,114,469 | Hirschfeldt | Apr. 19, 1938 |
| 2,391,911 | MacKenzie | Jan. 1, 1946 |
| 2,398,019 | MacKenzie | Apr. 9, 1946 |
| 2,407,889 | MacKenzie | Sept. 17, 1946 |
| 2,656,417 | Kilburg | Oct. 20, 1953 |